United States Patent
Fischer et al.

(10) Patent No.: US 12,344,325 B2
(45) Date of Patent: Jul. 1, 2025

(54) SYSTEMS AND METHODS FOR OFFSET WHEEL SPARE TIRE COVERS AND ACCESSORIES

(71) Applicant: Boomerang Enterprises, Inc., Longmont, CO (US)

(72) Inventors: Christopher Fischer, Boulder, CO (US); Jessica Fischer, Boulder, CO (US)

(73) Assignee: Boomerang Enterprises, Inc., Longmont, CO (US)

( * ) Notice: Subject to any disclaimer, the term of this patent is extended or adjusted under 35 U.S.C. 154(b) by 419 days.

(21) Appl. No.: 17/525,366

(22) Filed: Nov. 12, 2021

(65) Prior Publication Data

US 2023/0150587 A1 May 18, 2023

(51) Int. Cl.
| | | |
|---|---|---|
| *B62D 43/00* | (2006.01) | |
| *B60R 11/04* | (2006.01) | |
| *B65D 85/06* | (2006.01) | |
| *B60R 11/00* | (2006.01) | |

(52) U.S. Cl.
CPC ............ *B62D 43/005* (2013.01); *B60R 11/04* (2013.01); *B65D 85/06* (2013.01); *B60R 2011/004* (2013.01); *B60R 2011/0049* (2013.01)

(58) Field of Classification Search
CPC .............................. B62D 43/005; B60R 11/04
See application file for complete search history.

(56) References Cited

U.S. PATENT DOCUMENTS

| | | | |
|---|---|---|---|
| 5,676,288 A | 10/1997 | Spirk | |
| 5,876,328 A | 3/1999 | Fox et al. | |
| 5,996,863 A | 12/1999 | Burke | |
| 10,140,524 B2 * | 11/2018 | Varick | G06V 20/56 |
| 10,625,689 B2 * | 4/2020 | Yang | G03B 17/561 |
| 10,858,050 B2 * | 12/2020 | Headlee | B62D 43/02 |
| 10,887,556 B2 * | 1/2021 | Diaz | B60Q 1/2661 |

(Continued)

FOREIGN PATENT DOCUMENTS

| | | | | |
|---|---|---|---|---|
| CN | 110171494 A | * | 8/2019 | |
| CN | 112706845 A | * | 4/2021 | B60Q 1/44 |

(Continued)

OTHER PUBLICATIONS

MOPAR "Soft Tire Cover" www.mopar.com; K6862909 dated Mar. 30, 2018. 6 pages.

(Continued)

*Primary Examiner* — Justin M Larson

(57) ABSTRACT

The inventive technology described herein may be present in many different embodiments that include systems and methods for adjustably protecting a spare tire with a rearward-facing camera. In some embodiments, a spare tire protective system may utilize a hollow base, a camera collar, a retaining element such as a faceplate, and a tire cover to easily adjust to varying spare tire sizes and wheel offsets for vehicles that may be equipped with a center or near center-mounted rearview camera. A hollow base and camera collar may slide over a rearview camera stock and partially seat into a wheel center bore. A tire cover may be sandwiched between the hollow base and faceplate. This system may provide improved ease of installation and removal for vehicle models with varying wheel and tire offsets and sizes.

20 Claims, 10 Drawing Sheets

(56) References Cited

U.S. PATENT DOCUMENTS

| | | | |
|---|---|---|---|
| 11,110,976 B2 * | 9/2021 | Fischer | B60R 1/002 |
| 11,785,327 B2 * | 10/2023 | Byrne | H04N 23/54 |
| | | | 348/148 |
| 2006/0162406 A1 | 7/2006 | Chen | |
| 2008/0047985 A1 | 2/2008 | Newbill | |
| 2010/0264187 A1 | 10/2010 | Buskirk | |
| 2017/0072856 A1 * | 3/2017 | Varick | B62D 43/02 |
| 2017/0106720 A1 | 4/2017 | Gress et al. | |
| 2018/0178723 A1 * | 6/2018 | Diaz | B60Q 1/2661 |
| 2019/0275958 A1 * | 9/2019 | Yang | B60R 11/04 |
| 2020/0298917 A1 * | 9/2020 | Unger | B62D 43/02 |
| 2021/0016846 A1 | 1/2021 | Fischer et al. | |
| 2021/0300263 A1 * | 9/2021 | Nise | B60R 11/04 |
| 2023/0150587 A1 * | 5/2023 | Fischer | B60R 11/04 |
| | | | 206/304.1 |

FOREIGN PATENT DOCUMENTS

| | | | |
|---|---|---|---|
| CN | 115447684 A | * 12/2022 | |
| CN | 218634108 U | * 3/2023 | |
| FR | 3099444 A1 | * 2/2021 | B60R 11/04 |

OTHER PUBLICATIONS

Youtube, Mopar Spare Tire Cover for 2018 Jeep Wrangler JL with 32" Tire. Video dated Feb. 2, 2018. 1 page screenshot of video provided.

\* cited by examiner

SYSTEMS AND METHODS FOR OFFSET WHEEL SPARE TIRE COVERS AND ACCESSORIES

FIELD OF THE INVENTION

This inventive technology described herein generally relates to the field of protective spare tire covers and apparatus and methods of using the same. More specifically, this inventive technology relates to systems and methods for protective spare tire covers for vehicles having spare tire mounted rearview cameras, offset wheel sizes, or use in any other application where a vehicle component may have a need to be protected and may include an imaging source, such as but not limited to a camera. This inventive technology also relates to systems and methods for attaching accessories to a spare tire.

BACKGROUND OF THE INVENTION

In today's growing market for sport utility vehicles, it is now federally mandated that all new vehicles are equipped with a backup camera and video display. A typical location for a rear-facing backup camera on a sport utility vehicle, such as but not limited to the Ford Bronco®, may be the center of the rearward-facing spare tire mount. To reduce the effects of weathering on the tire compound, for decorative purposes, or the like, consumers and manufacturers may often put hard or soft-shelled protective covers on tires. In the present marketplace, consumers may have multiple choices when looking for a spare tire covering system. However, all of these covering systems may not work for each configuration of a particular vehicle. Consumers may be looking for ways to reduce the number of possible product configurations and to make purchasing decisions with more precision, accuracy, and ease. Returning a purchased product due to incorrect fitment can be a frustrating problem for consumers and may reflect poorly on the supplier of the product. Protecting spare tires from weathering and to provide a mounting point for functional or decorative features to a vehicle may be accomplished by several different conventional methods and apparatus. However, while these methods and apparatus may have been used for many years, substantial problems with the ease of use and compatibility with different model configurations or the like may remain unresolved. Some conventional methods for accessory mounting may also require drilling into or semi-permanently affixing a component to the body of the car, which may be undesired for consumers. U.S. Pat. No. 11,110,976 provides a spare tire cover having a protective cover for a backup camera that may lack adjustability and compatibility with different sized tires. The inventive technology allows for a single cover to cover multiple tire sizes utilizing a center or near center-mounted (within a one-inch diameter from center) rear-facing camera.

There may be a need for a model-specific protective tire cover that has the ability to fit all the different OEM model configurations. OEM's often offer wheels and tires in varying widths, offsets, and sizes. Leaving it up to a consumer to choose the correct sized tire cover may be a frustrating and challenging task for a consumer. The technology disclosed may solve that problem by providing one tire cover per model or by creating an adjustable spare tire cover, perhaps by allowing the position of the camera collar to be adjustable, thereby allowing the hollow base, faceplate, and the rearward facing surface of a tire cover also to be adjustable.

SUMMARY OF THE INVENTION

In general, the inventive technology may involve both apparatus and methods in a variety of embodiments to achieve a protective spare tire covering that utilizes an adjustable tire cover for varying tire and wheel sizes per a specific model utilizing a center-mounted rearward facing camera. In one embodiment of the present technology, each component may have multiple sizes, style configurations, or the like. Each varying embodiment may stem from a similar design, which may include a two-part clamping component (for example, a hollow base and a faceplate or retaining element), a spare tire cover, and a camera collar. The present technology may be utilized for protecting the spare tire on, for example, a 2020 to present-model-year Ford Bronco that utilizes a rear-mounted spare tire and a center-mounted rearward facing camera with varying wheel and tire sizes. In one embodiment, the internal base may be but is not limited to a cylindrical, semi-cylindrical, or any shape tube that fits in or over the spare tire wheel hub or center cap bore and/or fits securely over the rearview camera stock. This may be beneficial in vehicles that have varying wheel and tire widths with varying bolt pattern offsets to easily protect all varying models with one component. The inventive technology may be captured in different embodiments, including but not limited to a softcover tire protective system, a hardcover tire protection system, a rearward-facing camera stock accessory mounting system, or other desired systems, methods, apparatus, or processes, and the like.

In another embodiment, the internal camera collar may be a flexible material that may be molded to snuggly fit over the rearview camera stock and be able to nest inside the hollow base and may be captured through the use of a stepped feature by the faceplate, or the like. A protective tire covering systems and methods may include but is not limited to the following components:

| 1 | Spare tire cover |
|---|---|
| 2 | Faceplate |
| 3 | Camera collar |
| 4 | Camera stock |
| 5 | Hollow base |

BRIEF DESCRIPTION OF THE PREFERRED EMBODIMENTS

It should be understood that the inventive technology includes a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
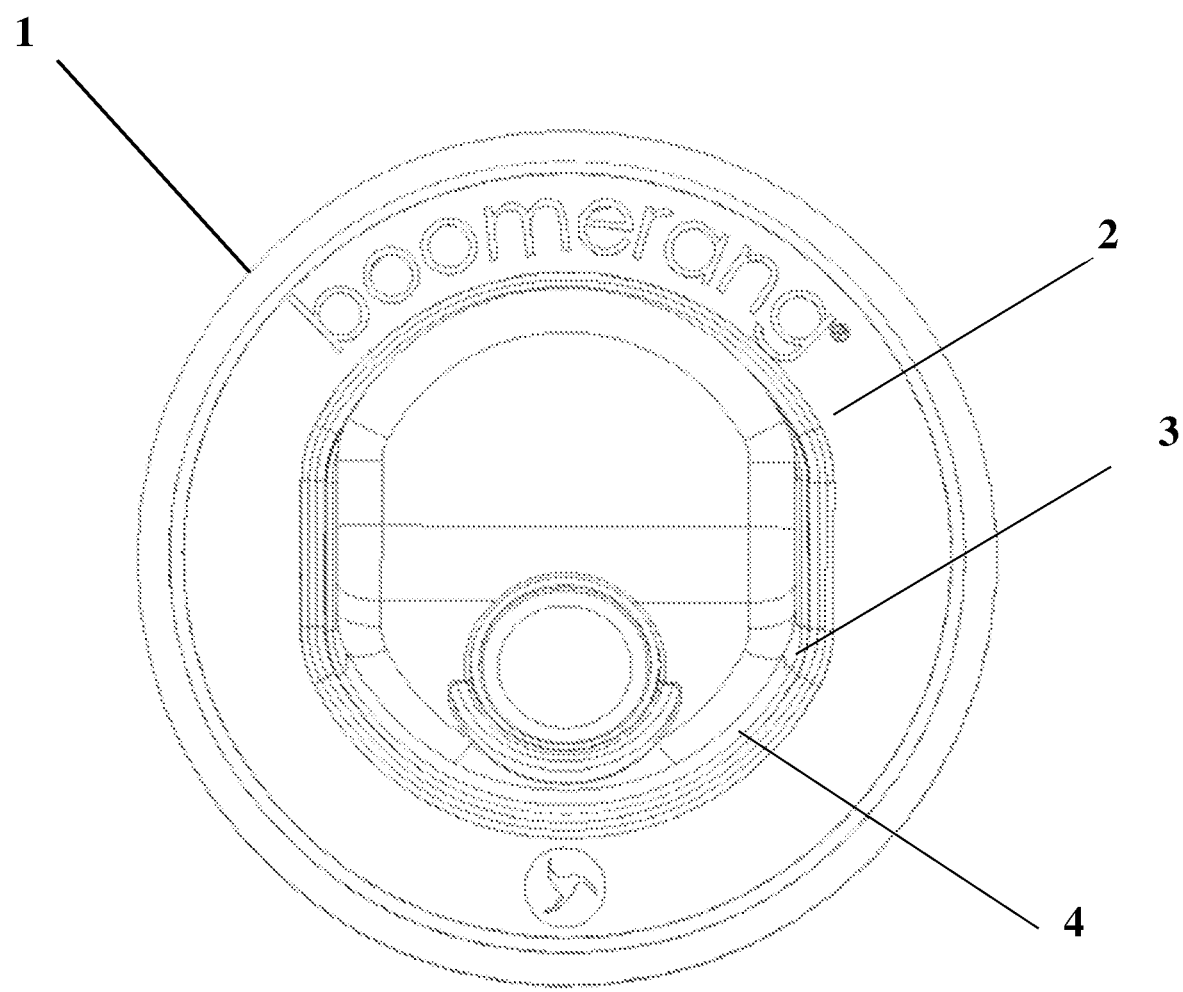
FIG. 1 is an exemplary embodiment of a front view of a protective tire covering system.

FIG. 1 is an exemplary embodiment of a front view of a protective tire covering system. In one embodiment, a protective covering system may be a spare tire protection system that may include a hollow base (5), a camera collar (3), a faceplate (2), and a spare tire cover (1), also shown in FIGS. 2, 3, 4, 5, 6, and 10. In one embodiment, the spare tire cover (1) may be made of but is not limited to a soft fabric, a rigid cover, or a protective weather-resistant fabric material. It may be beneficial that the spare tire cover be configured to stretch over or around a spare tire or the like utilizing a soft tire cover with an elastic, drawstring, or the like securing mechanism. A soft tire cover may be made from woven materials or the like. In one embodiment, the hollow base (5) may be but is not limited to, rigid materials such as varying structural plastics, metals, composites, or the like, such as Nylon, HDPE, ABS, GFRP, CFRP, or the like. In some embodiments, it may be beneficial to utilize a partially rigid tire cover that may mix both soft tire cover woven materials with rigid materials. In some embodiments, a tire cover may be interchangeable to accommodate for varying size wheels and tires while utilizing. in some embodiments, an interchangeable tire cover may be a soft tire cover that has a range of size, for example on soft cover for tires that are 35 inches in diameter and another soft cover for tires 37 inches in diameter. In some embodiments, an interchangeable tire cover may be a rigid tire cover that may have the ability to expand or contract depending on the diameter of tire used. Expansion and contraction of a rigid or partially rigid tire cover may be accomplished by utilizing expandable scales, telescoping sections, elastic materials, soft materials, or the like to accommodate varying tire dimensions. The rearward facing surface of the tire cover may be adjustable by positioning the camera collar and hollow base assembly to be coplanar (or near-coplanar, for example, within plus or minus one inch of the outermost tire surface plane) with the outermost tire surface plane. In some embodiments, it may be beneficial to utilize a cylindrically shaped base, semi-cylindrically shaped base (such as a cylinder with at least one flat wall) as a hollow base depending on the needs for the desired system or the design of the rearview camera stock. The hollow base (5) may be designed to slide over the rearview camera stock of a spare tire rearview camera and be designed to fit into the center bore of a spare tire. In some embodiments, the hollow base (5) may have at least one attachment boss (6), such as but not limited to a post to accept a screw, click type attachments, press-fit, adhesive mounting posts, or the like. It may be beneficial to have the attachment boss (6) be removable to facilitate a user changing the type of tire cover the user wishes to use. In some embodiments, a camera collar (3) may be made of a flexible material, such as but not limited to rubber to help grip the camera stock (4). In some embodiments, the camera collar (3) may slide into the hollow base (5) to provide a secure, adjustable positional fit for the hollow base (5). The camera collar may also have at least one internal grip that may be configured as grooves, ridges, or the like to grip the camera stock (4). In another embodiment, the camera collar may have external keyways (10) that correspond to internal keyways (11) on the hollow base to help prevent rotation of the hollow base on the camera stock (6). In another embodiment, it may be beneficial to have a semi-cylindrical or cylindrical camera collar. This may be beneficial depending on the design of the camera stock or to prevent rotation through the use of geometric shapes. In some embodiments, the faceplate (2) may be made from similar materials as the hollow base, such as metals, varying structural plastics, composites, or the like, such as Nylon, HDPE, ABS, GFRP, CFRP, or the like. In some embodiments, the faceplate may have at least one attachment boss (6) to assist in securing the faceplate to the hollow base. In another embodiment, the faceplate may be a simple retaining mechanism, such as a spring, safetywire, a cotter pin, or the like, configured to prevent axial movement of the camera collar. In one embodiment, it may be beneficial to allow the faceplate and hollow base to be removably coupled such as that the two components can be removed from each other. This may be accomplished by utilizing removable fasteners such as screws, bolts and nuts, clips, or the like. In some embodiments, the hollow base or faceplate may have arms that protrude outward like a flower petal, T-shape, or the like, to provide attachment positions for various accessories such as, as a license plate holder, brake light, reverse light, spotlight, shovel or ax clamps, additional accessories, or the like.

Figure 2:
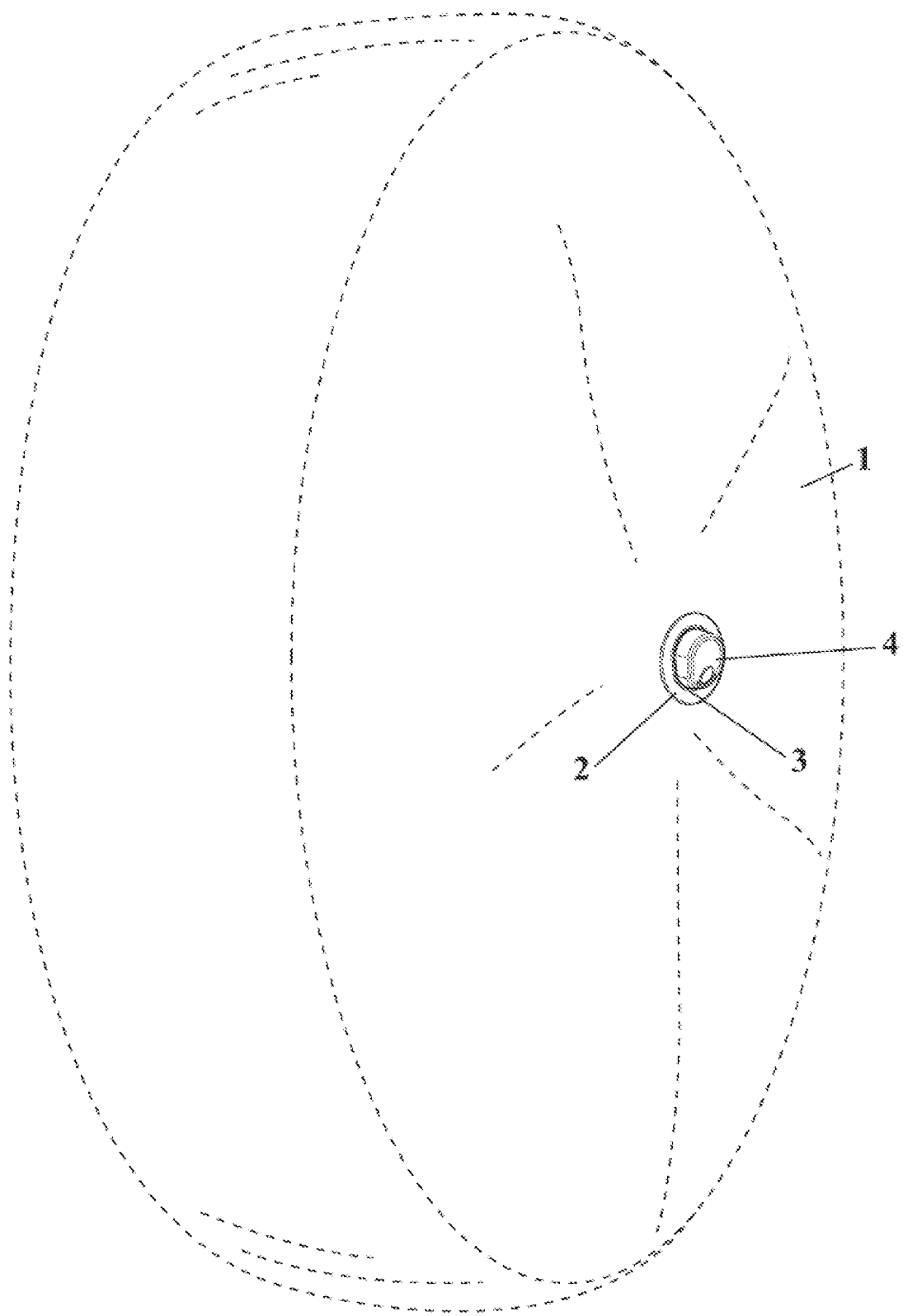
FIG. 2 is an exemplary embodiment of an isometric view of an installed tire protection system.

FIG. 2 is an exemplary embodiment of an isometric view of an installed tire protection system. As is shown in FIG. 2, some embodiments may utilize a soft tire cover. In one embodiment, the spare tire cover (1) may be made of but is not limited to a soft fabric, a rigid case, or protective weather-resistant fabric material. It may be beneficial that the spare tire be configured to stretch over or around a spare tire or the like. In some embodiments, it may be beneficial to utilize a drawstring, pull cord, mechanical clasping mechanism, elastic band, or the like to secure the spare tire cover to the spare tire. In some embodiments, a rigid tire cover, such as ABS, fiberglass, or the like, may be used as the spare tire cover.

Figure 3:
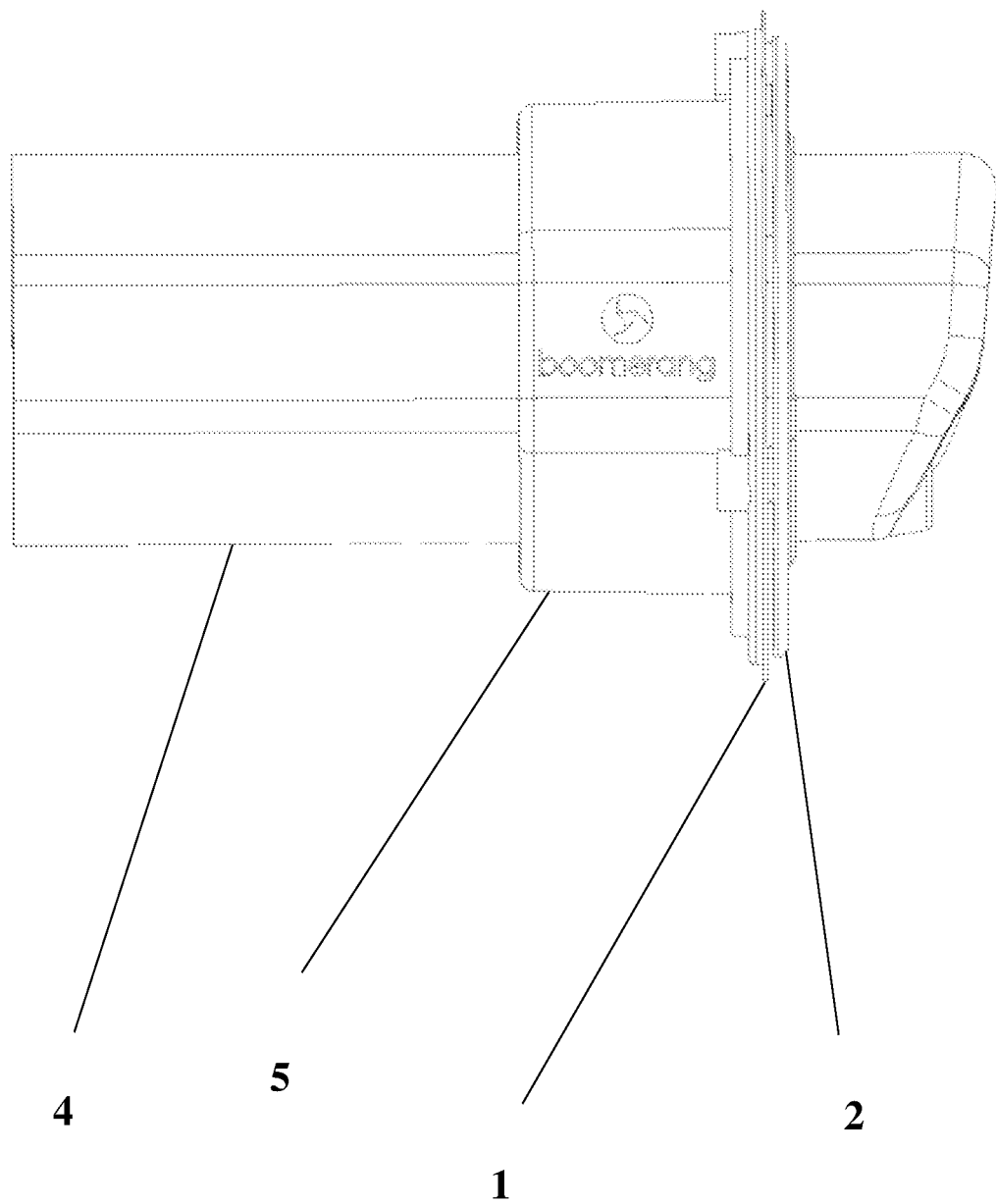
FIG. 3 is an exemplary embodiment of a rearview camera collar system for mounting accessories.

FIG. 3 is an exemplary embodiment of a rearview camera collar system for mounting accessories. In some embodiments, a rearview camera collar for mounting accessories may include an internally gripped camera collar, a first end of the internally gripped camera collar, a second end of the internally gripped camera collar. In one embodiment, an internally gripped camera collar may be made from a soft rubber, silicone, hard rubber, hard silicone material, or the like. The camera collar may also have internal grooves or ridges to grip the camera stock (4). In another embodiment, the camera collar may have external keyways that correspond to internal keyways on the hollow base to prevent rotation of the hollow base on the camera stock (4). In another embodiment, it may also be beneficial to have a semi-cylindrical, cylindrical camera collar, or the like. This may be beneficial depending on the design of the camera stock or to prevent rotation through the use of the geometric shape of the camera collar corresponding to the shape of the camera stock. In some embodiments, a first end of the internally gripped camera collar may be utilized that may be tapered. In some embodiments, this taper may be stepped, tapered, or similarly configured to accept the faceplate and to secure the protective covering system onto the camera stock. In some embodiments, the first end may be internally or externally tapered and stepped. In another embodiment, the internally gripped camera collar may have a second end that is proximate to at least one internal grip. In some embodiments, there may be more than one internal grip that may provide a more secure hold (i.e., a hold that provides more axial force to remove) on the camera stock. The second end may be configured to hold at least one internal grip but may include more grips if beneficial.

Figure 4:
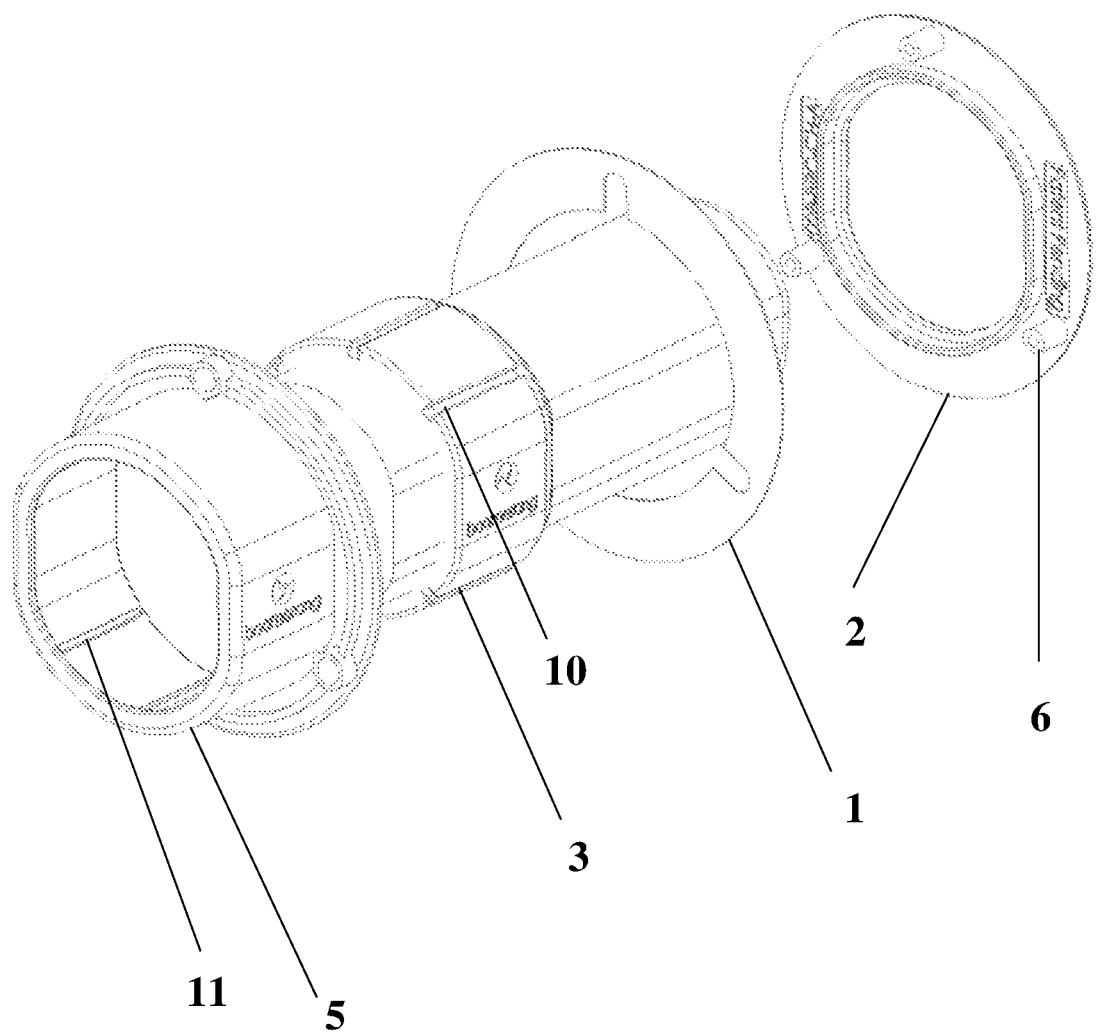
FIG. 4 is an exemplary embodiment of an adjustable spare tire covering system for use with arearward-facing camera.
Figure 5:
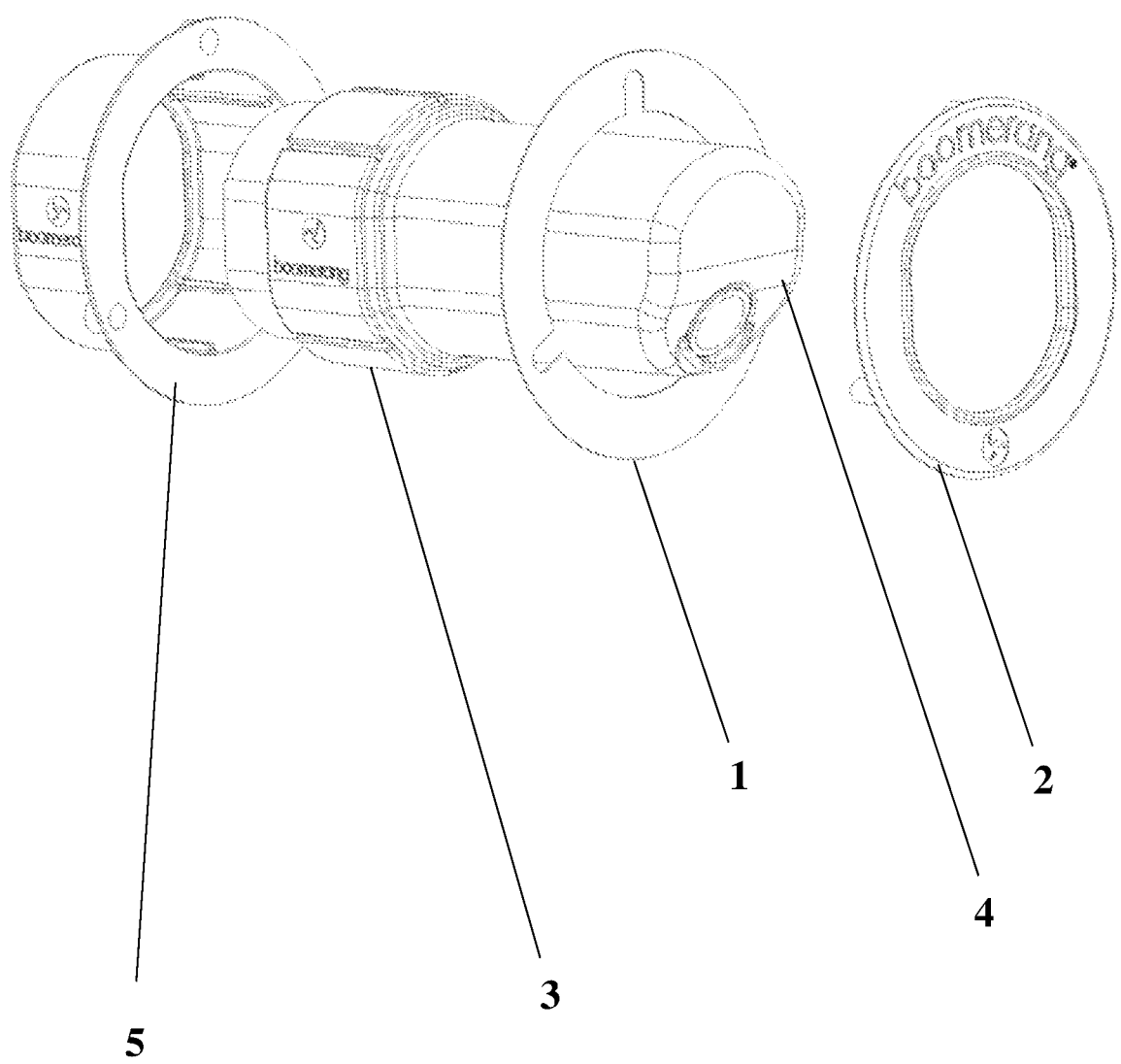
FIG. 5 is an exemplary embodiment of a protective tire covering system
Figure 10:
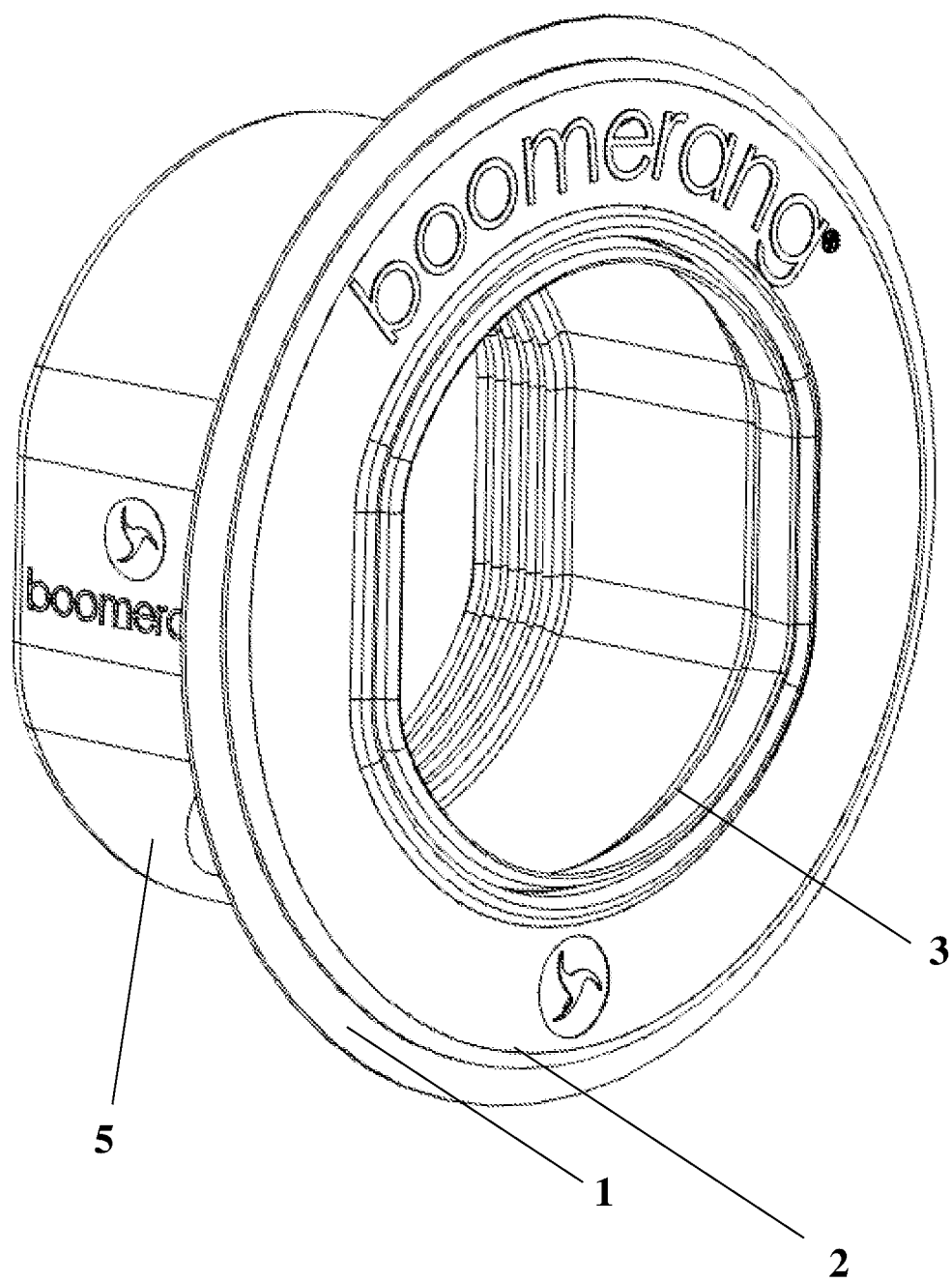
FIG. 10 is an exemplary embodiment of an assembled adjustable spare tire cover.

FIG. 4 is an exemplary embodiment of an adjustable spare tire covering system for use with a rearward-facing camera. In some embodiments, an adjustable spare tire covering system for use with a rearward-facing camera may include a hollow base (5), an adjustable camera grip, a tire cover (1), and a retaining element. FIG. 4 illustrates an adjustable spare tire covering system in an exploded view. FIG. 10 depicts an assembled adjustable spare tire covering system. In one embodiment, the hollow base (5) may be but is not limited to, metal, varying structural plastics, composites, such as Nylon, HDPE, ABS, GFRP, CFRP, or the like. In some embodiments, it may be beneficial to utilize a cylindrically shaped base, semi-cylindrical base (such as a cylinder with at least one flat wall) as a hollow based on the desired system's needs or the design of the rearview camera stock. The hollow base (5) may be designed to slide over the rearview camera stock of a spare tire rearview camera and be designed to fit into the center bore of a spare tire. In some embodiments, the hollow base (5) may have at least one attachment boss (6), such as but not limited to a post to accept a screw, click type attachments, press-fit, or adhesive mounting posts. It may be beneficial to have the attachment boss (6) be removable to facilitate a consumer changing the type of tire cover the consumer wishes to use. In some embodiments, the hollow base (5) may be configured as an accessory base with the ability to mount accessories. An accessory base may have brackets, T-shaped arms, or petals expanding outward from the accessory base to provide attachment positions for various accessories such as, as a license plate holder, brake light, reverse light, spotlight, shovel or ax clamps, fuel canisters, radio accessories, recovery devices, additional accessories, or the like. In some embodiments, these accessories may include a license plate holder, brake, light, reverse light, spotlight, additional accessory, or the like. These accessories may be built into the accessory base that may be configured as the hollow base. In some embodiments, an adjustable camera grip may be configured as a camera collar (3). In some embodiments, a camera collar (3) or adjustable camera grip may be made of a flexible material, such as but not limited to rubber to grip the camera stock (4). In some embodiments, the camera collar (3) may slide into the hollow base (5) to provide a secure, adjustable positional fit for the hollow base (5). The camera collar may also have internal grooves, ridges, or the like to help secure the camera collar (3) to the camera stock (4). In another embodiment, the camera collar may have external keyways (10) that correspond to internal keyways (11) on the hollow base to prevent rotation of the hollow base on the camera stock (6). In another embodiment, it may also be beneficial to have a semi-cylindrical or cylindrical camera collar. This may be beneficial depending on the design of the camera stock or to prevent rotation through the use of geometric shapes. In some embodiments, a retaining element may be configured as a faceplate (2) or as a simple retaining mechanism, such as a spring, safety wire, a cotter pin, or the like configured to prevent axial movement of the camera collar.

Figure 6:
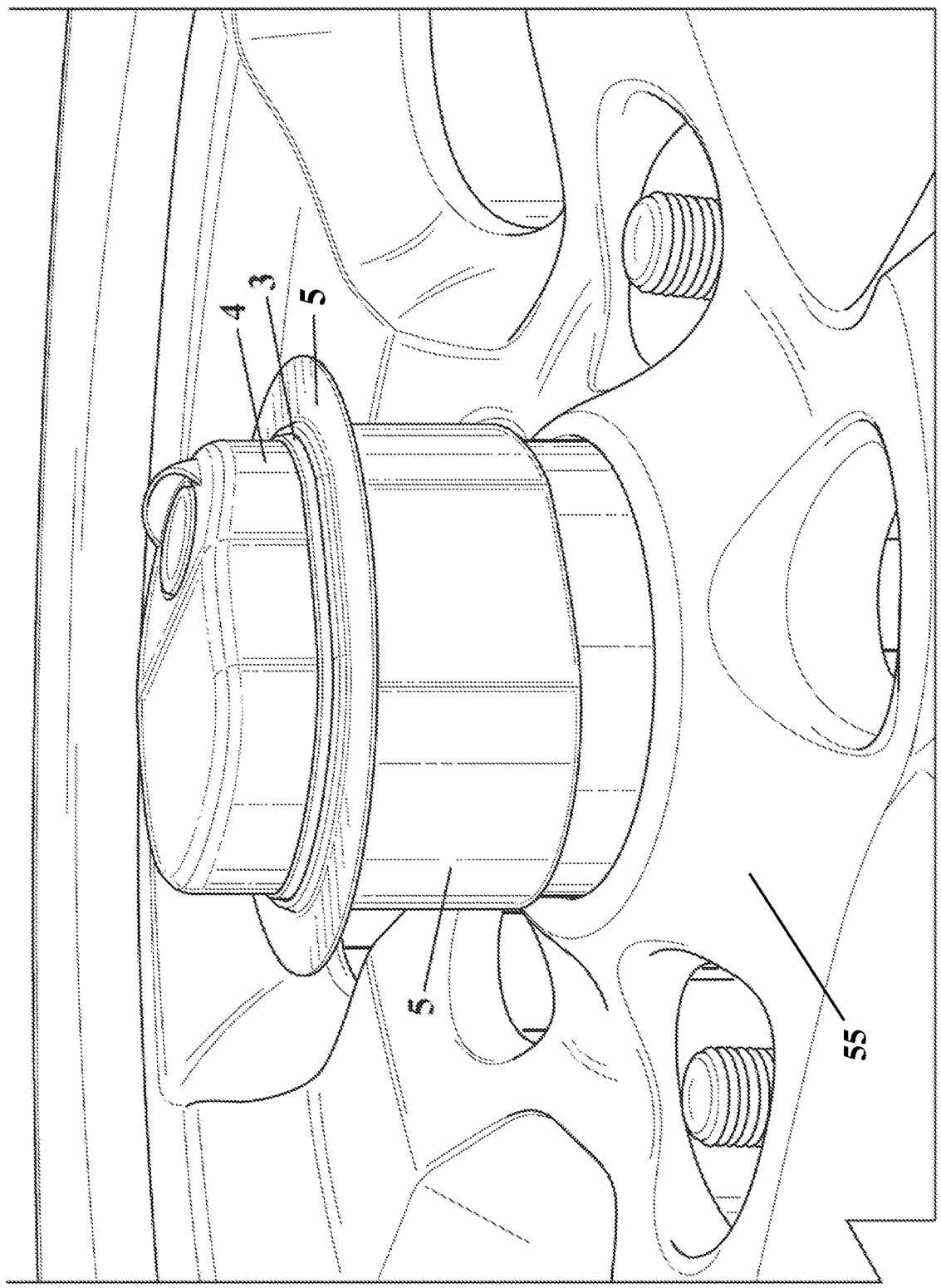
FIG. 6 is an exemplary embodiment of a protective tire covering system as installed over a wheelcenter bore and a rearview camera stock.

FIG. 6 is an exemplary embodiment of the hollow base seating into a wheel (55) center bore over a rearview camera stock. In one embodiment, a protective covering system may be a spare tire protection system that may include a hollow base (5), a camera collar (3), a faceplate (2 shown in at least FIG. 10), and a spare tire cover (1 shown in at least FIG. 1). The protective covering system may or may not seat into the spare tire wheel (55) center bore. In some embodiments, it may be beneficial for the hollow base to be capable of seating to the wheel center bore, and in other embodiments, due to the geometry of the wheel or tire it may not be beneficial for the hollow base to seat into the center bore. In the latter embodiment, the protective covering system may be only constrained by the camera collar (3) gripping the rearview camera stock (4). In one embodiment, the spare tire cover (1) may be made of but is not limited to a soft fabric, a rigid cover, or a protective weather-resistant fabric material. It may be beneficial that the spare tire cover be configured to stretch over or around a spare tire or the like utilizing a soft cover with elastic or the like securing mechanisms. In one embodiment, the hollow base (5) may be, but is not limited to, varying structural plastics, metals, composites, or the like, such as Nylon, HDPE, ABS, GFRP, CFRP, or the like. In some embodiments, it may be beneficial to utilize a cylindrically shaped base, semi-cylindrically shaped base (such as a cylinder with at least one flat wall) as a hollow base, depending on the needs for the desired system or the design of the rearview camera stock. The hollow base (5) may be designed to slide over the rearview camera stock of a spare tire rearview camera and be designed to fit into the center bore of a spare tire. In some embodiments, the hollow base (5) may have at least one attachment boss (6), such as but not limited to a post to accept a screw, click type attachments, press-fit, adhesive mounting posts, or the like. It may be beneficial to have the attachment boss (6) be removable to facilitate a customer changing the type of tire cover the consumer wishes to use. In some embodiments, a camera collar (3) may be made of a flexible material, such as but not limited to rubber to grip the camera stock (4). In some embodiments, the camera collar (3) may slide into the hollow base (5) to provide a secure, adjustable positional fit for the hollow base (5). The camera collar may also have internal grooves or ridges to grip the camera stock (4). In another embodiment, the camera collar may have external keyways (10) that correspond to internal keyways (11) on the hollow base to prevent rotation of the hollow base on the camera stock (6). In another embodiment, it may also be beneficial to have a semi-cylindrical or cylindrical camera collar. This may be beneficial depending on the design of the camera stock or to prevent rotation through the use of geometric shapes. In some embodiments, the faceplate (2) may be made from similar materials as the hollow base, such as metals, varying structural plastics, composites, or the like, such as Nylon, HDPE, ABS, GFRP, CFRP, or the like.

In some embodiments, the faceplate may have at least one attachment boss (6) to assist in securing the faceplate to the hollow base. In another embodiment, the faceplate may be a simple retaining mechanism, such as a spring, safety wire, cotter pin, or the like configured to prevent axial movement of the camera collar. In one embodiment, it may be beneficial to allow the faceplate and hollow base to be removably coupled such as that the two components can be removed from each other. This may be accomplished by utilizing removable fasteners such as screws, bolts and nuts, clips, or the like. In some embodiments, the hollow base or faceplate may have arms that protrude outward like a flower petal, T-shape, or the like, to provide attachment positions for various accessories such as a license plate holder, brake light, reverse light, spotlight, shovel or ax clamps, additional accessories, or the like.

Figure 7:
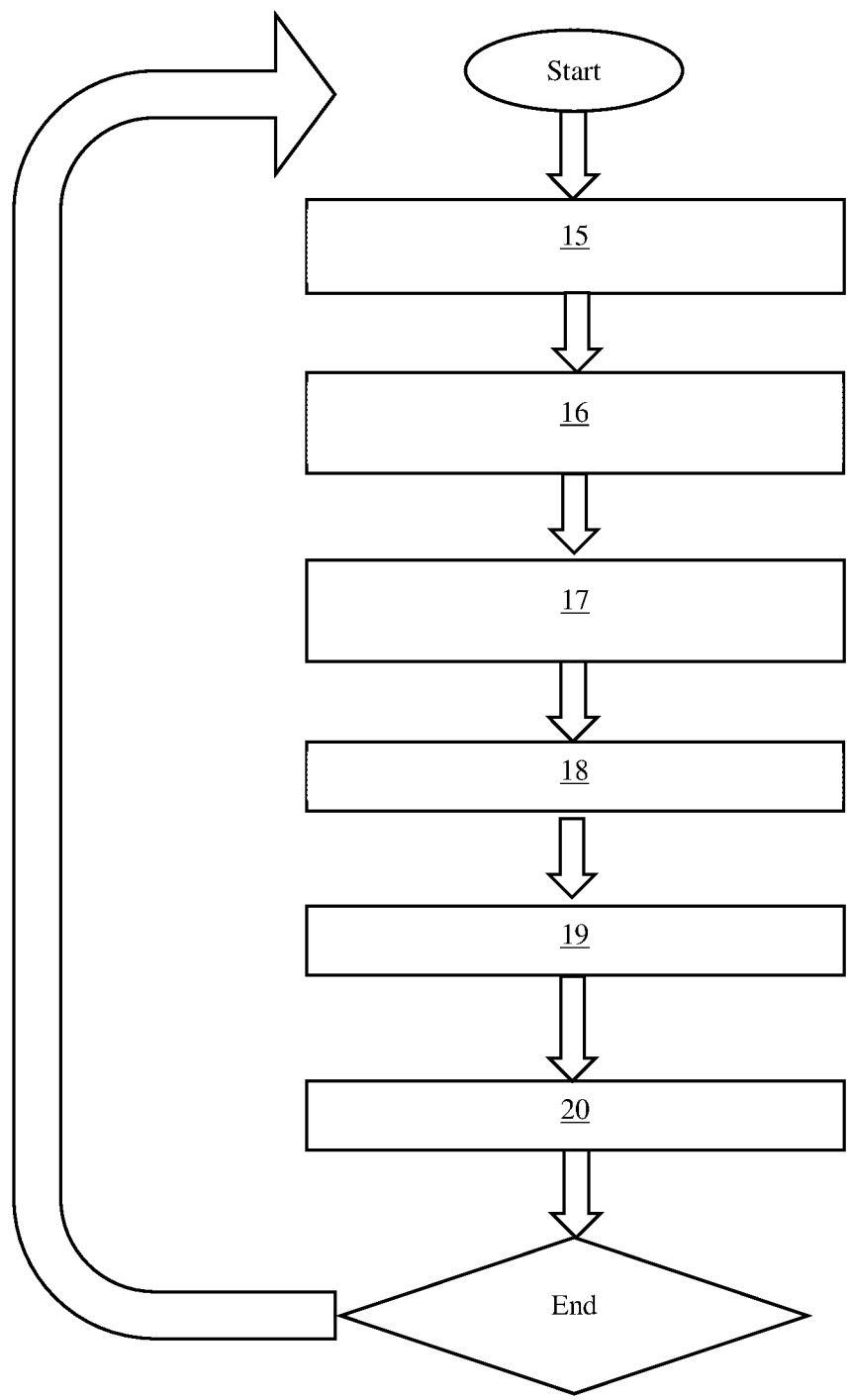
FIG. 7 is an exemplary embodiment of a method for protectively covering a spare tire having arearview camera.

FIG. 7 is an exemplary embodiment of a method for protectively covering a spare tire having a rearview camera. In some embodiments, a method for protectively covering a spare tire having a rearview camera may include utilizing a hollow base (15), sliding a camera collar over the camera stock (16), accepting a collar into the hollow base (17), covering a spare tire with a cover (18), sandwiching a cover between the hollow base and a faceplate (19), and capturing the collar with the faceplate (20). In some embodiments, the step of utilizing a hollow base may be accomplished by utilizing a cylindrically shaped base, a semi-cylindrical shaped base, or the like. In some embodiments, a semi-cylindrical base may be beneficial in preventing rotation of the hollow base on the camera stock. In some embodiments, the step of accepting a camera collar into the hollow base may be accomplished by interlocking at least one collar keyway on the collar and at least one base keyway on the hollow base. This may further prevent rotation, may allow for a more constrained system or other like benefits. In some embodiments, it may be beneficial to utilize a flexible material for the camera collar. A flexible material may be, for example, soft rubber, silicone, hard rubber, hard silicone material, or the like. This may be beneficial in that these materials tend to have a higher coefficient of friction than a hard plastic or composite material that may be beneficial in assisting the internal grips in allowing the camera collar to remain stable on the camera stock. In some embodiments, the step of sliding a camera collar over the camera stock may be accomplished by positively engaging at least one internal camera collar grip configured to positively engage said camera collar with said camera stock. In another embodiment, the step of sandwiching a cover between the hollow base and an external component cover may be accomplished by sandwiching a soft tire cover, a rigid tire cover, or the like between the hollow base and an external component. In some embodiments, the external component may be a faceplate, retaining element, or the like that may assist in preventing axial movement of the camera collar. In one embodiment, the spare tire cover (1) may be made of but is not limited to a soft fabric, a rigid cover, or protective weather-resistant fabric material. It may be beneficial that the spare tire be configured to stretch over or around a spare tire or the like. In some embodiments, it may be beneficial to utilize a drawstring, pull cord, clasping mechanism, elastic band, or the like to secure the spare tire cover to the spare tire. In some embodiments, a rigid tire cover, such as ABS, fiberglass, or the like, may be used as the spare tire cover.

Figure 8:
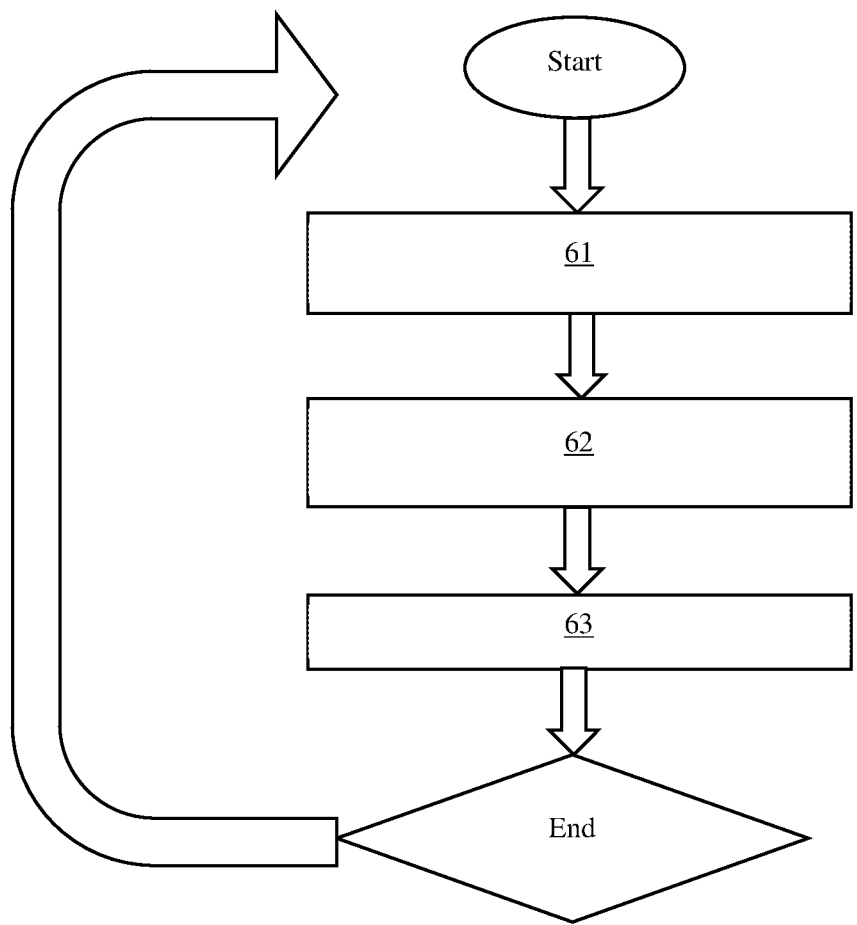
FIG. 8 is an exemplary embodiment for a method of adjustably covering a spare tire with rewardfacing camera.

FIG. 8 is an exemplary embodiment of a method of adjustably covering a spare tire with a rearward-facing camera. In some embodiments, a method for adjustably covering a spare tire with a rearward-facing camera may include the steps of sandwiching a tire cover between a base and a retaining element over a rearview camera stock (61), seating an adjustable camera grip into the base (62), and limiting movement of the adjustable camera grip with a retaining element (63). In some embodiments, the step of sandwiching a tire cover between a base and a retaining element over a rearview camera stock may be accomplished by sandwiching a soft tire cover, such as but not limited to cloth, vinyl, leather, composite, or the like. Some embodiments may use a softcover, and others may use a hardcover. Hardcovers may be made from materials such as molded plastic, composites, metals, or the like. In some embodiments, the step of seating an adjustable camera grip into the base (62) may be accomplished by sliding, guiding, positioning, or the like an adjustable camera grip onto the base. This step may position the adjustable camera grip in the location that is right for the application (that being the installed wheel size, wheel offset, tire width, tire diameter, or the like). In some embodiments, the adjustable camera grip may include at least one internal grip that may assist in holding the position of the camera grip on the camera stock. In some embodiments, the camera grip may be rubber, silicone, or other material of the like. The camera grip may also be a molded part that is configured to provide a secure fit (such as a slip fit, near press fit, press-fit, or the like) around a rearview camera stock. In some embodiments, a molded camera grip may include soft rubber internal grips or the like to assist in a secure fit with the rearview camera stock. In some embodiments, the step of limiting movement of the adjustable camera grip with a retaining element (63) may be accomplished by limiting movement with a spring, safety wire, retention clip, faceplate, or the like. In one embodiment, the step of limiting movement of said adjustable camera grip with said retaining may be accomplished by limiting movement of the adjustable camera grip with a retention clip, spring, safety wire, a faceplate, or the like. In some embodiments, the faceplate (2) may be made from similar materials as the hollow base, such as varying structural plastics, composites, or the like, such as Nylon, HDPE, ABS, GFRP, CFRP, or the like. In some embodiments, the step of seating an adjustable camera grip into said base may be accomplished by transferring enough static force to said camera stock to hold said adjustable camera grip in place after positioning said adjustable camera grip on a reward facing camera stock. In some embodiments, this may be beneficial because depending on the geometry of the camera stock and spare tire assembly, the camera collar may be the only component keeping the protective spare tire cover from moving and remaining securely attached to the vehicle. A material configured to have a coefficient of friction high enough to hold secure (without or with minimal movement) may be used for the camera collar in order to provide enough static force to be transferred from the camera collar to the camera stock. In another embodiment, it may be beneficial to include a step of aligning at least one adjustable camera grip external keyway with at least one base internal keyway. In another embodiment, the camera collar may have external keyways that correspond to internal keyways on the hollow base to prevent rotation of the hollow base on the camera stock (6). In some embodiments, the said step of seating an adjustable camera grip into said base may be accomplished by seating a cylindrically shaped adjustable camera grip, semi-cylindrical shaped adjustable camera grip, or the like into the hollow base. In some embodiments seating a semi-cylindrical or other non-cylindrical adjustable camera collar into the base may prevent rotation of the protective spare tire covering system. In some embodiments, it may also be beneficial to add the step of covering a tire that may be accomplished by utilizing a soft tire cover, rigid tire cover, or the like. In some embodiments, a soft tire cover, such as but not limited to cloth, vinyl, leather, composite, or the like. Some embodiments may use a softcover, and others may use a hardcover. Hardcovers may be made from materials such as molded plastic, composites, metals, or the like. The method for mounting accessories may be used to mount components such as a license plate holder, brake light, reverse light, spotlight, shovel or ax clamps, additional accessories, or the like. These accessories may be built into the accessory base that may be configured as the hollow base.

Figure 9:
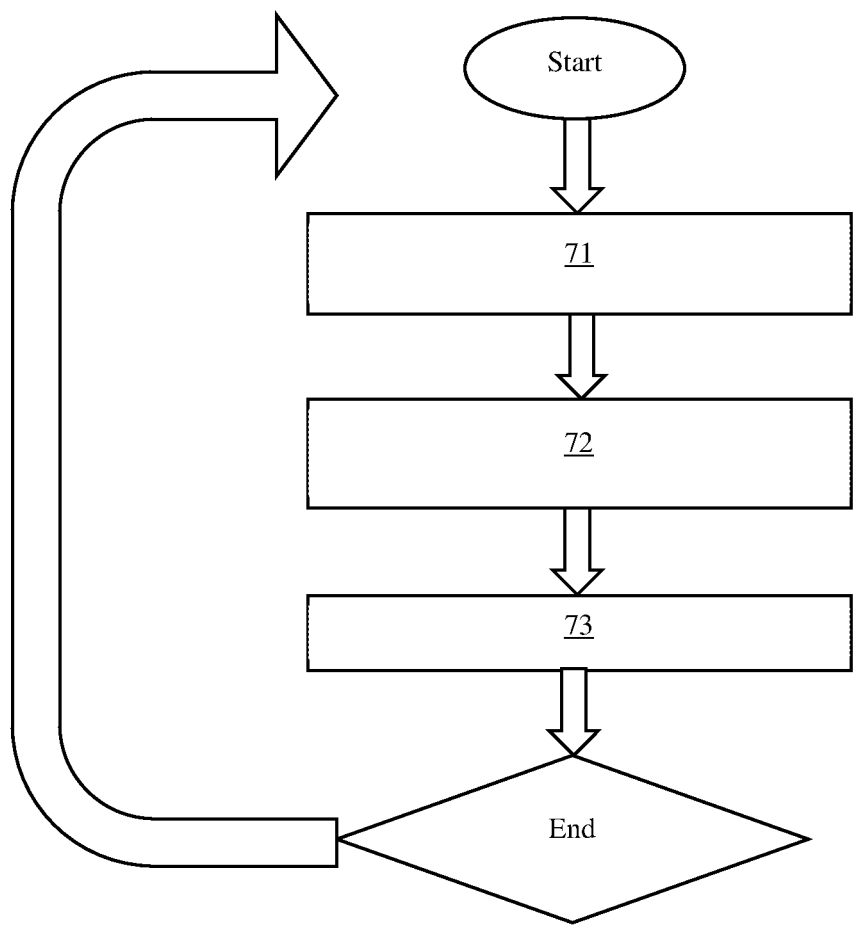
FIG. 9 is an exemplary embodiment of an exemplary method for mounting accessories on a rearview camera.

FIG. 9 is an exemplary embodiment of an exemplary method for mounting accessories on a rearview camera. In one embodiment, a method for mounting accessories on a rearview camera may include the steps of placing an internally gripped camera over a rearview camera stock (71), tapering a first end of the internally gripped camera collar (72), providing a second end of said internally gripped camera collar, wherein the second end may be proximate to at least one internal grip (73), or the like. In some embodiments, it may be beneficial to further include the step of accepting
at least one external camera collar keyway into at least one corresponding internal keyway of an accessory base. This may assist in preventing rotation of the internally gripped camera collar in the accessory base. In one embodiment, the step of placing an internally gripped camera collar over a rearview camera stock may be accomplished by securely gripping a spare tire rearview camera stock with the internally gripped camera collar. In one embodiment, securely gripping the camera stock may be gripping the camera stock with enough static force to prevent or limit rotational or axial movement of the internally gripped camera collar. In one embodiment, the step of placing an internally gripped camera collar over a rearview camera stock may be accomplished by preventing rotation of the internally gripped camera collar, wherein the internally gripped camera collar comprises a semi-cylindrical internally gripped camera collar. It may be beneficial to use a semi-cylindrical, cylindrical, non-cylindrical, or the like shaped internally gripped camera collar depending on the shape of the rearview camera stock. In some embodiments, it may be beneficial to further add the step of retaining the internally gripped camera collar with a retaining element configured to prevent axial movement of said internally gripped camera collar. This may be accomplished by limiting movement with a retaining element such as a spring, safety wire, retention clip, faceplate, or the like. In one embodiment, the step of limiting movement of said adjustable camera grip with said retaining element may be accomplished by limiting movement of the adjustable camera grip with a retention clip, spring, safety wire, a faceplate, or the like. In some embodiments, the faceplate (2) may be made from similar materials as the hollow base, such as varying structural plastics, composites, or the like, such as Nylon, HDPE, ABS, GFRP, CFRP, or the like.

Previously presented definitions of embodiments, together with newly developed spare tire protection and covering systems and methods, intuitive statements of embodiments from incorporated specifications, are all now incorporated.

As can be easily understood from the foregoing, the basic concepts of the various embodiments of the present invention(s) may be embodied in a variety of ways. It involves both systems and methods for offset wheel spare tire covers and accessories, including techniques as well as devices to accomplish the appropriate covering and protection for spare tires and wheels. In this application, covering and protection for spare tires and wheels techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also may be varied in a number of ways. Importantly, as to all of the foregoing, all of these facets should be understood to be encompassed by this disclosure.

The discussion included in this nonprovisional application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, or the like. These words and types of words are to be understood in a dictionary sense as terms that encompass an ample or considerable amount, quantity, size, etc. as well as terms that encompass largely but not wholly that which is specified. Further, for this application, if or when used, terms of degree, terms of approximation, and/or relative terms should be understood as also encompassing more precise and even quantitative values that include various levels of precision and the possibility of claims that address a number of quantitative options and alternatives.

For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified). For example, using percentage values as one example, for the camera collar product to be substantially only the desired product, it should be understood that embodiments of the invention may encompass the option of percentage values that include 99.5%, 99%, 97%, 95%, 92% or even 90% of the output being the desired camera collar retention strength. Correspondingly for values at the other end of the spectrum (e.g., camera collar retention looseness embodiments of the invention should be understood as encompassing the options of percentage values that include not more than 0.5%, 1%, 3%, 5%, 8% or even 10% as camera collar retention looseness whether by volume, by weight, or by count. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person having ordinary skill in the art of this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes or the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention (s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "spare tire covering system" should be understood to encompass disclosure of the act of "covering"—whether explicitly discussed or not— and, conversely, were there effectively disclosure of the act of "covering," such a disclosure should be understood to encompass disclosure of a "cover" and even a "means for covering." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Nonprovisional Patent Application or other information statement filed with the application are hereby appended and hereby incorporated by reference, however, as to each of the above, to the extent that such information or statements incorporated by reference might be considered inconsistent with the patenting of the various embodiments of invention(s) such statements are expressly not to be considered as made by the applicant(s).

Thus, the applicant(s) should be understood to have support to claim and make claims to embodiments including at least: i) protecting and gripping devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, it should be understood that in characterizing these and all other aspects of the various embodiments of the invention(s)—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, or the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, or the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, or the like claims.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A spare tire protection system comprising:
a hollow base;
a camera collar, wherein said camera collar has a first end and a second end;
a faceplate, wherein said camera collar comprises a camera collar capable of being sandwiched between said base and said faceplate; and
a spare tire cover, wherein said spare tire cover comprises a spare tire cover capable of being coupled between said base and said faceplate.

2. A spare tire protective system as described in claim 1 wherein said hollow base comprises a hollow cylindrical shaped base.

3. A spare tire protection system as described in claim 1 wherein said hollow base comprises a hollow semi-cylindrical shaped base.

4. A spare tire protection system as described in claim 1 wherein said hollow base comprises at least one internal keyway.

5. A spare tire protection system as described in claim 1 wherein said hollow base comprises a rigid material base.

6. A spare tire protective system as described in claim 1 wherein said camera collar comprises at least one external keyway, wherein said at least one external keyway aligns with at least one base internal keyway.

7. A spare tire protection system as described in claim 1 wherein said camera collar comprises a flexible material camera collar.

8. A spare tire protection system as described in claim 1 further comprising an internal collar grip to facilitate a secure fit to a camera stock, wherein said internal collar grip is proximate to said second end of said camera stock.

9. A spare tire protection system as described in claim 1 further comprising a stepped tapered opening at said first end of said camera collar.

10. A spare tire protection system as described in claim 1 wherein said cover comprises a soft tire cover.

11. A spare tire protection system as described in claim 1 wherein said cover comprises a partially rigid tire cover.

12. A spare tire protection system as described in claim 1 wherein said base plate and said faceplate are removably coupled.

13. A method to provide a protective covering for a spare tire having a rearview camera stock comprising the steps of:
utilizing a hollow base;
sliding a camera collar over said camera stock;
accepting said collar into said hollow base;
covering said spare tire with a cover;
sandwiching said cover between said hollow base and an external component; and
capturing said collar with said external component.

14. A method to provide a protective covering for a spare tire having a rearview camera stock as described in claim 13 wherein said hollow base comprises a cylindrical shaped hollow base.

15. A method to provide a protective covering for a spare tire having a rearview camera stock as described in claim 13 wherein said hollow base comprises a semi-cylindrical shaped hollow base.

16. A method to provide a protective covering for a spare tire having a rearview camera stock as described in claim 15 wherein said hollow base is configured to prevent rotation.

17. A method to provide a protective covering for a spare tire having a rearview camera stock as described in claim 13 wherein said step of accepting said collar into said hollow base comprises the step of interlocking at least one collar keyway on said collar and at least one base keyway on said hollow base.

18. A method to provide a protective covering for a spare tire having a rearview camera stock as described in claim 13 wherein said camera collar comprises a camera collar made of a flexible material.

19. A method to provide a protective covering for a spare tire having a rearview camera stock as described in claim 13 wherein said step of sliding a collar over said camera stock comprises gripping said collar internally to positively engage said camera stock and said collar.

20. A method to provide a protective covering for a spare tire having a rearview camera stock as described in claim 13 wherein said step of sandwiching said cover between said hollow base and an external component cover comprises the step of sandwiching a soft tire cover.

* * * * *